United States Patent [19]
McRae

[11] Patent Number: 5,585,555
[45] Date of Patent: Dec. 17, 1996

[54] BOREHOLE STRAINMETER

[75] Inventor: John B. McRae, South Strafford, Vt.

[73] Assignee: Geokon, Inc., Lebanon, N.H.

[21] Appl. No.: 377,184

[22] Filed: Jan. 24, 1995

[51] Int. Cl.$^6$ .................................................. E21B 47/00
[52] U.S. Cl. .......................... 73/152.17; 73/768; 73/783; 73/784; 33/542.1; 33/544; 166/66; 166/250.01; 166/255.1
[58] Field of Search ........................... 73/151, 152, 768, 73/775, 781, 783, 784, 786, 803, 866.5; 166/66, 255.1, 250.01; 33/544, 544.3, 544.5, 544.6, 542.1

[56] References Cited

U.S. PATENT DOCUMENTS

| | | | |
|---|---|---|---|
| 3,557,886 | 1/1971 | Cobbs | 73/783 |
| 3,562,916 | 2/1971 | Duckworth | 73/151 |
| 3,686,943 | 8/1972 | Smith | 73/151 |
| 4,104,911 | 8/1978 | Lavigne et al. | 73/151 |
| 4,372,161 | 2/1983 | de Buda et al. | 73/866.5 |
| 4,382,335 | 5/1983 | Frank | 33/125 B |
| 4,468,952 | 9/1984 | Rathburn | 73/40.5 |
| 4,515,010 | 5/1985 | Weido et al. | 73/151 |
| 4,719,803 | 1/1988 | Capelle et al. | 73/784 |
| 4,813,278 | 3/1989 | Kosugi | 73/784 |
| 4,844,197 | 7/1989 | Maissa | 151/105 |
| 5,033,307 | 7/1991 | Uhri et al. | 73/784 |
| 5,060,751 | 10/1991 | Kuhlman et al. | 181/102 |
| 5,355,950 | 10/1994 | Zwart | 73/866.5 |

FOREIGN PATENT DOCUMENTS

| | | |
|---|---|---|
| 0039278 | 11/1981 | European Pat. Off. . |
| 2270331 | 3/1994 | United Kingdom . |

OTHER PUBLICATIONS

"Rod Extensometers with Packer Anchors" INTERFELS, Germany; Product No. 121 Code 9020; Date unknown; company brochure.
"Borehole Extensometer Untensioned Stainless Steel Rod MPBX", SINCO Slope Indicator Co.,; Published 1988; company brochure.
"Waste Isolation Extensometers"; Published 1988; SINCO Slope Indicator Co.; company brochure.
"Distofor Multiple Base Length Borehole Extensometer"; Coyne et Bellier licence; date unknown; TELEMAC; company brochure, date unknown.
"Rod–Type Extensometer," Model A–6; GEOKON Incorporated; company brochure, date unknown.
"Rod–Type Borehole Extensometers"; GEOKON Incorporated; company brochure, date unknown.

Primary Examiner—Richard Chilcot
Assistant Examiner—George M. Dombroske
Attorney, Agent, or Firm—Hayes, Soloway, Hennessey, Grossman & Hage, P.C.

[57] ABSTRACT

A recoverable, multiple position borehole strainmeter is provided. The strainmeter includes at least two anchors having pistons for releasably engaging the borehole whereby to mount the strainmeter in the borehole. A pneumatic actuator for controllably, independently actuating the pistons to engage the borehole is provided. A biasing mechanism prevents the pistons from engaging the borehole when the pistons are not being actuated by the actuator, and a relative displacement sensor senses changes in relative displacement between adjacent anchors whereby to monitor relative mass displacement axially along the borehole between the anchors.

18 Claims, 5 Drawing Sheets

BOREHOLE STRAINMETER

BACKGROUND OF THE INVENTION

1. Field of the Invention

The present invention relates generally to a borehole strainmeter or extensometer, and more specifically, to a recoverable, multiple position strainmeter for a borehole for measuring changes in strain along the borehole. Particular utility for the present invention is found in the area of measurement of changes of loading strain in support piles, although other utilities are also contemplated.

2. Brief Description of Related Prior Art

Piles are load-bearing supports used to construct foundations of buildings and other large structures. Support piles are normally of two types, driven or cast-in-place. Driven piles are usually made from steel beams or steel pipes that are filled with concrete after driving and precast concrete segments. Cast-in-place piles are usually made from concrete which is cast-in-place in large diameter drilled holes in soil and/or rock or from a combination of steel beams and concrete cast-in-place in drilled holes.

Borehole strainmeters are instruments that are used to measure changes in strain in piles after the pile is in position. The strainmeter measures relative displacements of the pile at various depths in the pile. Such measurements permit the load bearing capacity and load distribution characteristics of the pile and surrounding ground to be determined. This permits the relative stability of the pile and soil surrounding the borehole to be determined, so as to be able to decide whether they are adequate for the intended structure to be constructed.

Borehole strainmeters typically comprise three main components: at least one displacement sensor, one or more anchors at various depths in the pile, and rods or wires for interconnecting the anchors with the displacement sensor. The sensor is usually mounted inside a reference head located in the pile and includes an electrical or mechanical readout. Changes in strain distribution along the pile due to changes in loading of the pile and/or shifting of the distribution of the surrounding soil mass are reflected in changes of relative axial displacements between the anchors, which are measured by the displacement sensor.

As used herein, a borehole strainmeter with a single anchor and a rod or wire extending between the anchor and the reference head is defined as a "single position borehole strainmeter." A strainmeter with a plurality of anchors is defined as a "multiple position borehole strainmeter."

Most conventional borehole strainmeters are designed to be permanently embedded within the pile (with e.g., concrete), and are cast or driven together with the pile into the borehole. Disadvantageously, such strainmeters cannot be recovered (i.e., removed from the pile) after use (e.g., after sufficient strain measurement data are collected). This is economically wasteful. Also disadvantageously, given the harshness of the installation process, quite often such strainmeters are damaged or destroyed while being cast or driven with the pile into the borehole.

One type of recoverable prior art borehole extensometer is disclosed in U.S. Pat. No. 4,719,803 to Capelle et al. The extensometer disclosed in Capelle et al. is positionable in a borehole for monitoring relative mass displacements axially along the borehole between at least two spaced-apart anchor points. The strainmeter includes at least two anchor members arranged in spaced-apart opposite relationship to define the at least two anchor points. Each of the anchor members have radially displaceable borehole wall contacting means and include mechanical means for radially outwardly displacing the borehole wall contacting means for engaging the borehole wall and to thereby fix the anchor member in the borehole against the wall thereof. A linear displacement sensing means is arranged between the anchor members, connected to one of the anchor members, and includes an elongated axially movable sensor element. The sensor element is normally biased in a direction toward the other anchor member for contact engagement therewith. Relative mass displacements are transmitted to the sensor element and are measured by the displacement sensing means as a variation in distance between the anchor members within the borehole. The anchor members each have a cylindrical body and multiple elongated axially extending borehole wall contacting elements arranged circumferentially of the body. The mechanical means includes axially movable cams arranged in the body and cam follower means connected to the radially displaceable borehole wall contacting element and cooperable with the cam means upon movement thereof for radially outwardly displacing the element to contact the borehole. Connection rods are preferably used to connect the anchors and sensor.

According to Capelle et al., their extensometer must be assembled, element by element, inside the borehole, and the anchors must be separately mechanically actuated from within the borehole, using specialized tools including setting tubes and rods inserted into the borehole. In practice, these are cumbersome and time-consuming processes, given the fact that most boreholes are no more than several inches in diameter, and it is difficult to assemble and actuate the extensometer in such a confined space. Indeed, it has been found that installation of the Capelle et al. device into boreholes of one hundred feet or more in depth may take several hours. Additionally, in the Capelle et al. extensometer, the displacement transducer is compressively spring-loaded against the anchors. This compressive biasing can cause the connecting rod between the anchors to bend or buckle, thereby decreasing the extensometer's measurement accuracy, especially if the rod is greater than several several feet in length. Finally, in order to remove the Capelle et al. extensometer from the borehole, the cumbersome and time-consuming processes used to assemble the extensometer and actuate the anchors must be reversed to dis-assemble and deactuate the extensometer and anchors.

Other prior art devices of general relevance to the subject invention are disclosed in U.S. Pat. No. 4,844,197 to Maissa and U.S. Pat. No. 5,060,751 to Kuhlman et al. These devices suffer from the aforesaid and/or other disadvantages and drawbacks.

OBJECTS OF THE INVENTION

Accordingly, it is the general object of the present invention to provide a recoverable borehole or pile strainmeter that overcomes the disadvantages and drawbacks of the prior art, and more specifically, to provide a strainmeter that is quick and easy to install in, and remove from, the borehole or pile, that does not require specialized tools to actuate and de-actuate, and overcomes the problems associated with the Capelle et al. extensometer and other prior art devices.

SUMMARY OF THE INVENTION

In accordance with the present invention, there is provided a recoverable multiple position borehole strainmeter which comprises at least two anchors including respective piston means for releasably engaging the borehole to releasably mount the anchors in the borehole in spaced-apart relationship to each other. Actuation means is provided for controllably actuating the piston means to engage the borehole. The actuation means is adapted to permit each of the piston means to be independently actuable from outside the borehole via control means located outside the borehole. Biasing means are also provided for preventing the piston means from engaging the borehole when the piston means are not being actuated. Also, relative displacement sensing means is provided for sensing changes in relative displacement between adjacent ones of the anchors whereby to monitor relative mass displacement axially along the borehole between the adjacent anchors.

In one preferred embodiment of the invention, axial alignment means including at least one rod for interconnecting the anchors is provided for axially aligning the anchors and the sensing means.

Advantageously, the recoverable strainmeter of the present invention may be completely assembled prior to be being inserted into the borehole or pile. After being inserted into the borehole, the strainmeter of the present invention then may be simply and easily remotely actuated (i.e., from outside the borehole), without requiring that specialized tools be inserted into, and manipulated from outside, the borehole or pile.

These and other advantages of the present invention will become apparent as the following Detailed Description proceeds and upon reference to the Drawings, wherein like numerals depict like parts, and wherein:

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited only as set forth in the accompanying claims.

DETAILED DESCRIPTION OF PREFERRED EMBODIMENTS

As shown in FIGS. 1–4, strainmeter 10 comprises a plurality of stainless steel anchors 14A, 14B, 14C in axial spaced-apart relationship along the inside of pile 12. Each of the anchors 14A, 14B, 14C includes a plurality of piston means 30A . . . 30D, 32A . . . 32D, and 34A . . . 34D, respectively, extending from the anchors to engage the pile 12 to hold or mount the anchors in axial alignment and spaced-apart relationship in the borehole.

Figure 1:
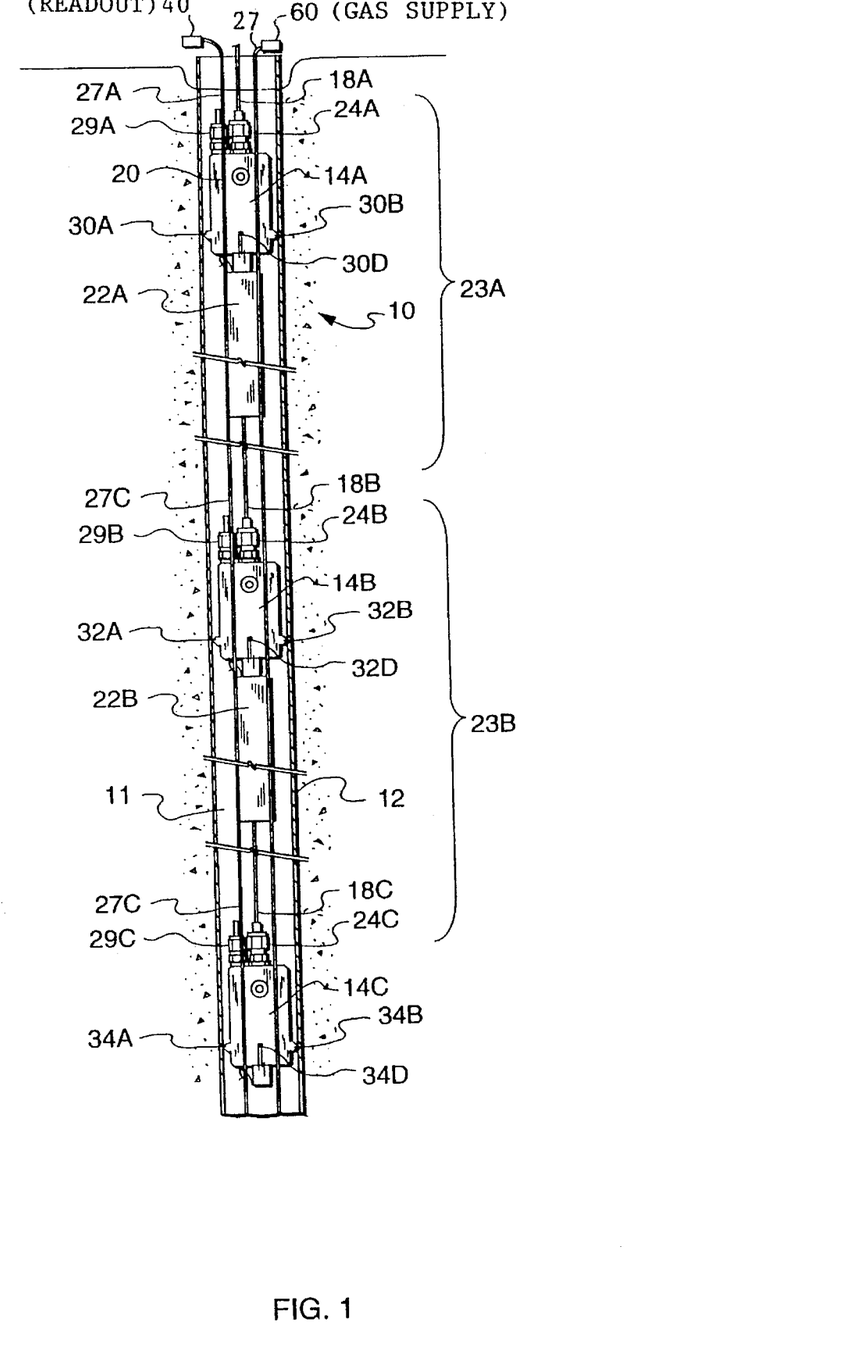
FIG. 1 is a side view of a section of one preferred embodiment of the present invention shown deployed inside a pile in a borehole.

Anchors 14A, 14B, 14C are interconnected by sensing means 22A, 22B and connecting rods 18B, 18C, in a manner that is more fully explained below. Outside rod 18A is connected to the anchor closest to the outside of the borehole (14A, as shown in FIG. 1), and permits the whole assembly 10 to be centered or otherwise positioned in the borehole from outside the borehole. Preferably, rods 18A, 18B, 18C are cylindrical in shape and are made of stainless steel, invar, graphite, or fiberglass. Also preferably, rods 18A, 18B, 18C are connected to the anchors 14A, 14B, 14C, respectively, via conventional Swagelok®-type compression fittings 24A, 24B, 24C which are mounted to the rods 18A, 18B, 18C and screwed into mating couplings in the anchors.

Every two adjacent anchors are interconnected via a rod and a sensing means. For example, adjacent anchors 14A and 14B are connected together via rod 18B and sensor 22A. Likewise, adjacent anchors 14B and 14C are connected together via rod 18C and sensor 22B.

Changes in relative axial position of the anchors 14A, 14B, 14C due to changes in strain along pile 12 are measured by sensors 22A and 22B. Sensors 22A and 22B then transmit signals representative of these changes to the conventional readout means 40 outside the borehole via a conventional electrical cable 26. Cable 26 includes electrical signal cables 26A and 26B from sensors 22A and 22B, respectively. Cable 26 also supplies electrical power to sensing means 22A and 22B from readout means 40 and/or an external power supply (not shown).

Inflation/deflation gas supply lines (referenced collectively at the top of FIG. 1 by numeral 27) comprise separate gas lines 27A, 27B, 27C which connect anchors 14A, 14B, 14C, respectively, to gas supply means 60. Lines 27A, 27B, 27C are connected respectively to anchors 14A, 14B, 14C via conventional fittings 29A, 29B, 29C (e.g., Swagelok® compression type fittings). As will be explained more fully below, lines 27A, 27B, 27C permit gas supply means 60 to separately and independently actuate and de-actuate the piston means of each of the anchors by controllably supplying and removing gas from the piston means.

Figures 2, 3:
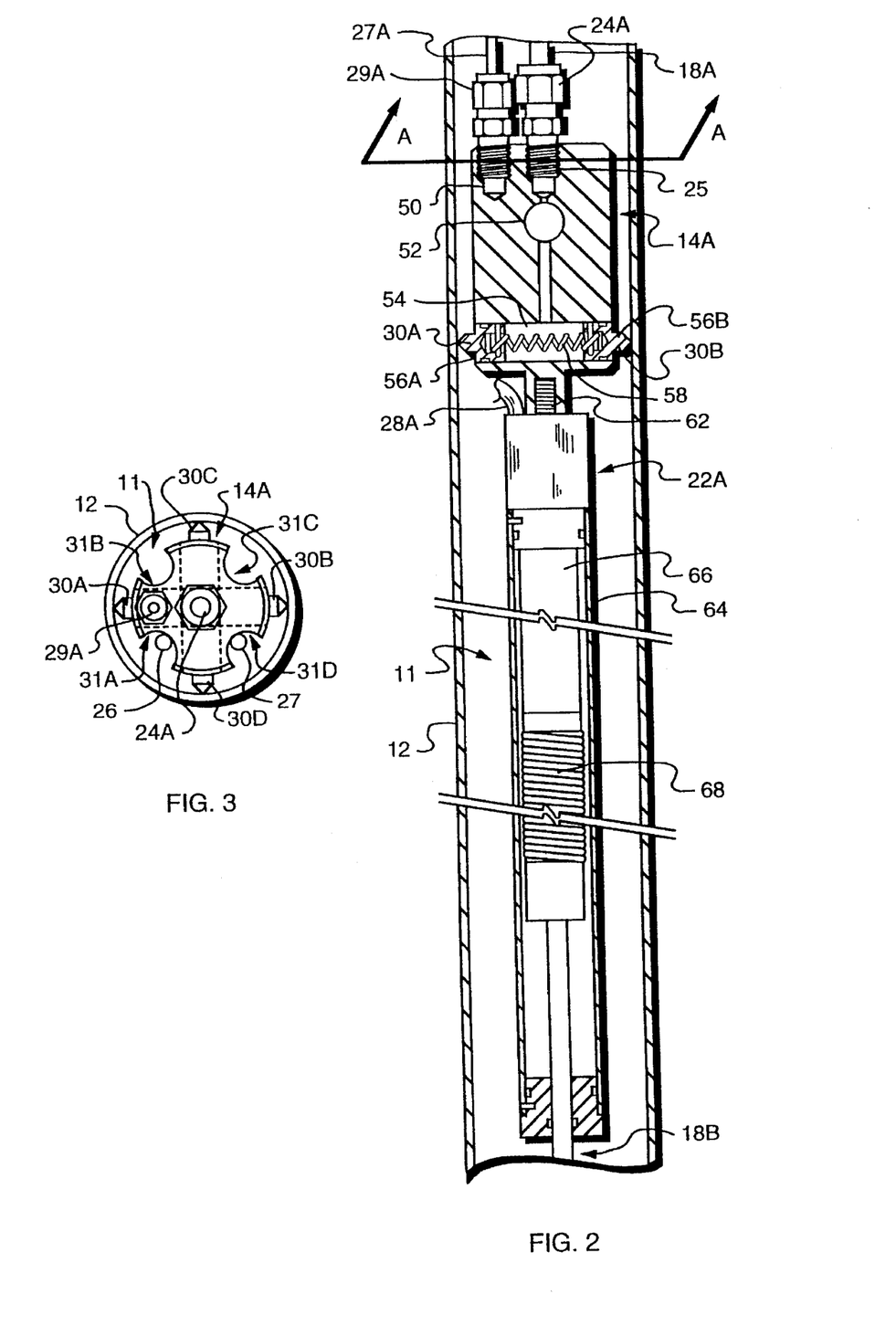
FIG. 2 is a side, cross-sectional view of one anchor and connected sensor of the preferred embodiment of FIG. 1, showing a more detailed construction thereof.
FIG. 3 is a cross-sectional view through an anchor of the embodiment of FIGS. 1 and 2, which view is taken perpendicular to the cross-sectional view of FIG. 2, along lines A—A.

FIGS. 2 and 3 illustrate, in greater detail, the construction of the anchor-sensor assembly 23A. Although only the construction of the elements of one anchor-sensor assembly 23A will be described, it will be appreciated that the construction of the elements of assembly 23B and any other assemblies (not shown) are substantially identical to that of assembly 23A. Assembly 23A comprises anchor 14A, sensor 22A, and rods 18A, 18B. Rod 18A is connected via conventional Swagelok® compression fitting 24A (mounted in a conventional mating fitting 25) to anchor 14A. Likewise, inflation/deflation line 27A is connected via conventional screw-type fitting 29A to anchor 14A. Line 27A permits gas communication between gas supply means 60 and internal cavity 54 via internal channels 50 and 52.

Piston means 30A . . . 30D preferably comprise at least one pair 30A and 30B of diametrically opposing pistons, and most preferably, two diametrically opposing pairs 30A and 30B, and 30C and 30D, of pistons, which extend at least partially from anchor 14A at right angles to each other. Preferably, piston means pair 30A and 30B comprises a pair of locking pistons slidably mounted by conventional means in internal cavity 54. Locking pistons 30A and 30B are adapted to slide in cavity 54 to extend at least partially out of anchor 14A to engage the borehole or pile, upon actuation by supply of pressurized gas to internal cavity 54 from gas actuation means 60 through line 27A.

Locking pistons 30A and 30B are connected together by biasing return spring mechanism means 58 which serves to provide a contraction force to the pistons 30A and 30B. Preferably, the contractive force provided to the pistons 30A and 30B by biasing means 58 is adapted (e.g., by adjusting the return spring 58 so as to have an appropriate spring constant) to prevent the locking pistons from extending outside of the anchor when no gas is being supplied to the internal cavity 54 by the means 60. That is, the contraction force supplied to the pistons 30A and 30B by biasing means 58 is adapted to prevent the locking pistons from engaging the borehole when not being actuated by supply of pressurized gas from the pneumatic actuating means 60.

It will be appreciated that although only the construction and operation of piston pair 30A and 30B has been described, the piston pair 30C and 30D is also disposed in cavity 54 and its construction and operation are substantially identical to that of piston pair 30A and 30B.

Sensing means 22A is preferably connected to anchor 14A via conventional screw mechanism 62. Sensing means 22A comprises metal or hard plastic housing 64 in which is disposed conventional vibrating-string type transducer means 66. Although not shown explicitly in FIGS. 1–4, it will be appreciated by those skilled in the art that the vibrating string of transducer 66 is attached via screw mechanism 62 to anchor 14A, and via shaft tensioning spring 68 and connecting rod 18B to anchor 14B, so as to enable transducer 66 to sense changes in relative axial positioning of anchors 14A and 14B along pile 12 and borehole 11. Alternatively, transducer 66 may comprise a linear variable displacement transducer or a linear potentiometer. The transducer transmits electrical signals representative of these changes in relative positioning to the readout means 40 via cable 26A.

As noted above, tensioning spring 68 is connected between transducer means 66 and connecting rod 18B (via conventional means, not shown). Preferably, tensioning spring 68 is made of metal and is adapted (e.g., by appropriately adjusting its spring constant and/or other conventional techniques) to apply a tensile force to the connecting rod 18B when the transducer 66 is positioned within its desired, optimal operating range. Preferably, this tensile force is greater than the gravitational force acting on the rod 18B. It has been found that this permits the rod 18B to remain oriented in the borehole in substantial axial alignment with the anchors 14A and 14B and the transducer 66. Advantageously, this increases the accuracy of the relative positioning measurements obtained by the transducer 66. Thus, spring 68 and rod 18B comprise means for axially aligning anchors 14A and 14B and transducer 66 in borehole 11 whereby to increase the measurement accuracy of the transducer 66.

With particular reference now being made to FIG. 3, anchor 14A preferably is of cylindrical cross-section, and has a plurality of recessed semi-circular grooves 31A . . . 31D. These grooves 31A . . . 31D serve as channels into which cable (referenced collectively by numeral 26) and inflation tubes (referenced collectively by numeral 27) are confined (e.g., by being taped therein by conventional heavy-duty duct-type tape) to guide them from the anchors or transducers (as the case may be) to the readout means or gas supply means 60, respectively. Advantageously, by confining the cable 26 and tubes 27 to channels 31A . . . 31D the effective cross-sectional area of the strainmeter 10 may be reduced, which reduction serves to make installation of the strainmeter 10 into the hole 11 easier.

Figure 4:
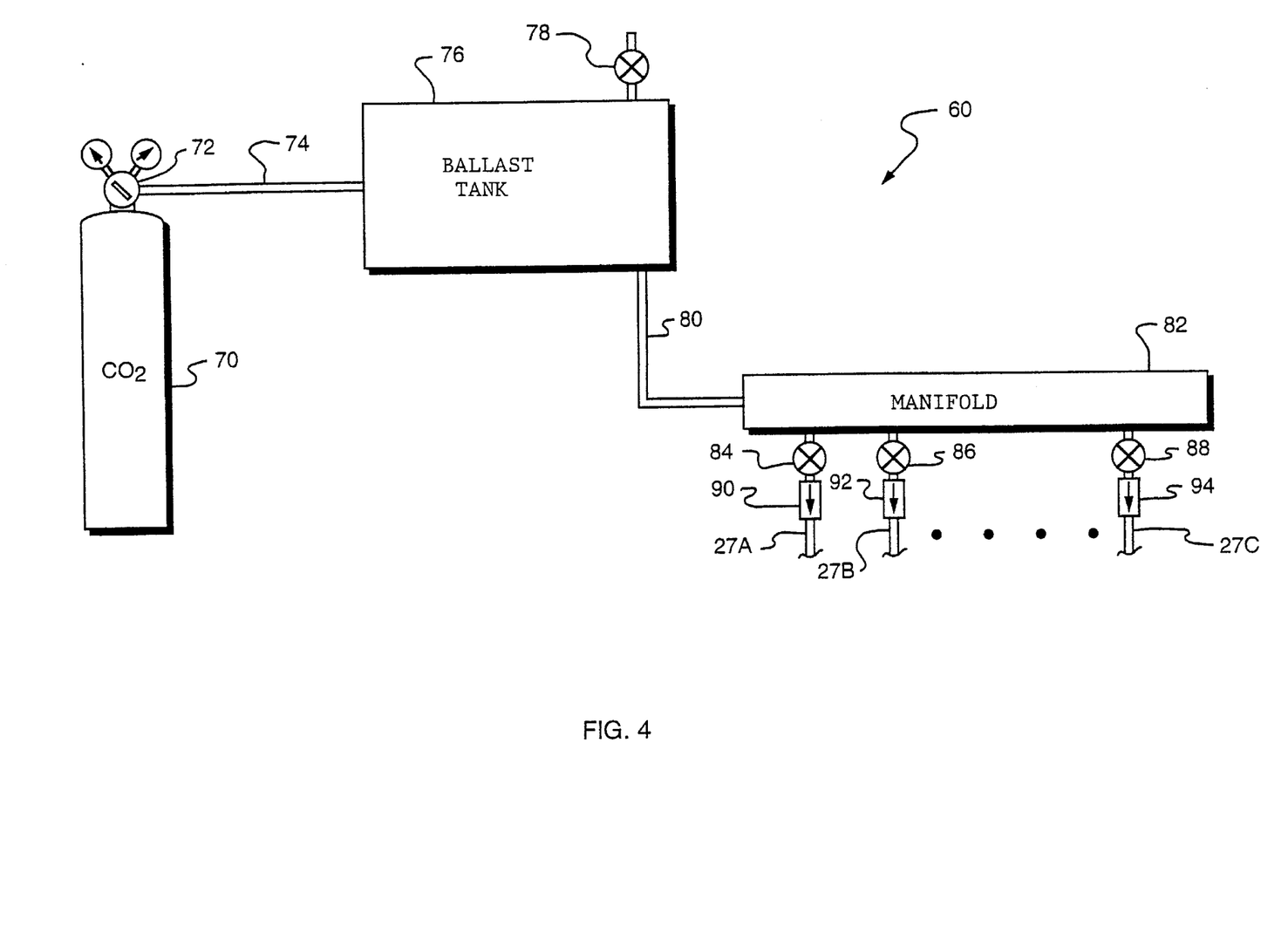
FIG. 4 is schematic block diagram of the actuation means of the embodiment of FIGS. 1–3.

Referring now to FIG. 4, the construction of the actuation means 60 in this embodiment of the present invention will now be described. Preferably, actuation means 60 comprises a source of pressurized gas (e.g., carbon dioxide) 70. Source 70 has a conventional regulator means 72 for controllably releasing gas from source 70. Gas released from source 70 enters ballast tank 76 via gas line 74. During actuation of the anchors, bleed valve 78 is ordinarily closed to prevent escape of the gas to the atmosphere, but may be opened to further regulate pressure of the gas. Optional ballast tank 76 communicates via line 80 with supply manifold 82. Supply manifold 82 comprises a plurality of separate control valves 84, 86, 88 which communicate with supply lines 27A . . . 27C for actuating the piston means of the anchors by supplying them with the pressurized gas. It should be understood that although only three control valves 84, 86, 88 are shown in FIG. 4, any number of control valves may be used so long as the number used permits independent control of supply of actuating gas to each of the anchors, respectively (i.e., the number of control valves is made equal to the number of anchors). Preferably, control valves 84, 86, 88 also comprise conventional check valve mechanisms 90, 92, 94, respectively, for bleeding pressurized gas from lines 27A, 27B, 27C to the atmosphere. Once gas has been supplied to the anchors to actuate the piston means, the piston means may be independently, separately de-actuated by utilizing the release mechanisms of the control valves to release the actuating pressurized gas from the anchors via the supply lines into the atmosphere.

It should also be understood that although only three anchors, two sensors, and three rods are shown in FIG. 1 any number thereof may be used without departing from this embodiment of the present invention, depending upon the particular depth of the borehole into which the system 10 is intended to be inserted, and other design constraints, so long as the general form of construction described herein is followed.

A preferred method for assembling the strainmeter 10 and for installing it in the borehole 11 or pile 12 will now be described. Usually, at the time of installation, those involved in the testing of the strain characteristics of the borehole will have already determined the depth of the borehole and the optimal number of anchors needed to test that depth. Using this information, the number of anchor-sensor assemblies is determined and the lengths of the rods are tailored to satisfy the depth of the borehole. The sensors are mounted in the anchors and the connecting rods are connected to the sensors and the anchors, so as to form the individual anchor-sensor assemblies and link them together. The cables and gas supply lines are then guided through and confined to the semi-circular grooves of the anchors. Advantageously, all of the above assembly steps may be executed outside of the borehole.

Once the strainmeter has thus been assembled, it is fed into the borehole. When the strainmeter is adequately positioned in the borehole, the cables and gas supply lines are then connected to the readout means and the actuation means, respectively. The control valve to the deepest anchor is opened first and the pistons thereof are actuated to mount the anchor in place in the borehole. The strainmeter is then tensioned (i.e., pulled up) until the correct operational reading of the deepest transducer means is shown on the readout means. The piston means of the next deepest anchor is then actuated. This process is repeated until all of the anchors are set in place.

Once installed in the borehole, the strainmeter is immediately ready to be used to take strain measurements. After the measurements have been taken, the above installation process is reversed to remove the strainmeter from the borehole.

Advantageously, it has been found that installation of the strainmeter of the present invention having six anchors into a borehole of one hundred feet takes less than one hour. This is an improvement of several fold over the installation time required for the Capelle et al. system. Additionally, the strainmeter of the present invention offer substantially more accurate readings and is much easier to use than the Capelle et al. system.

Figure 5:
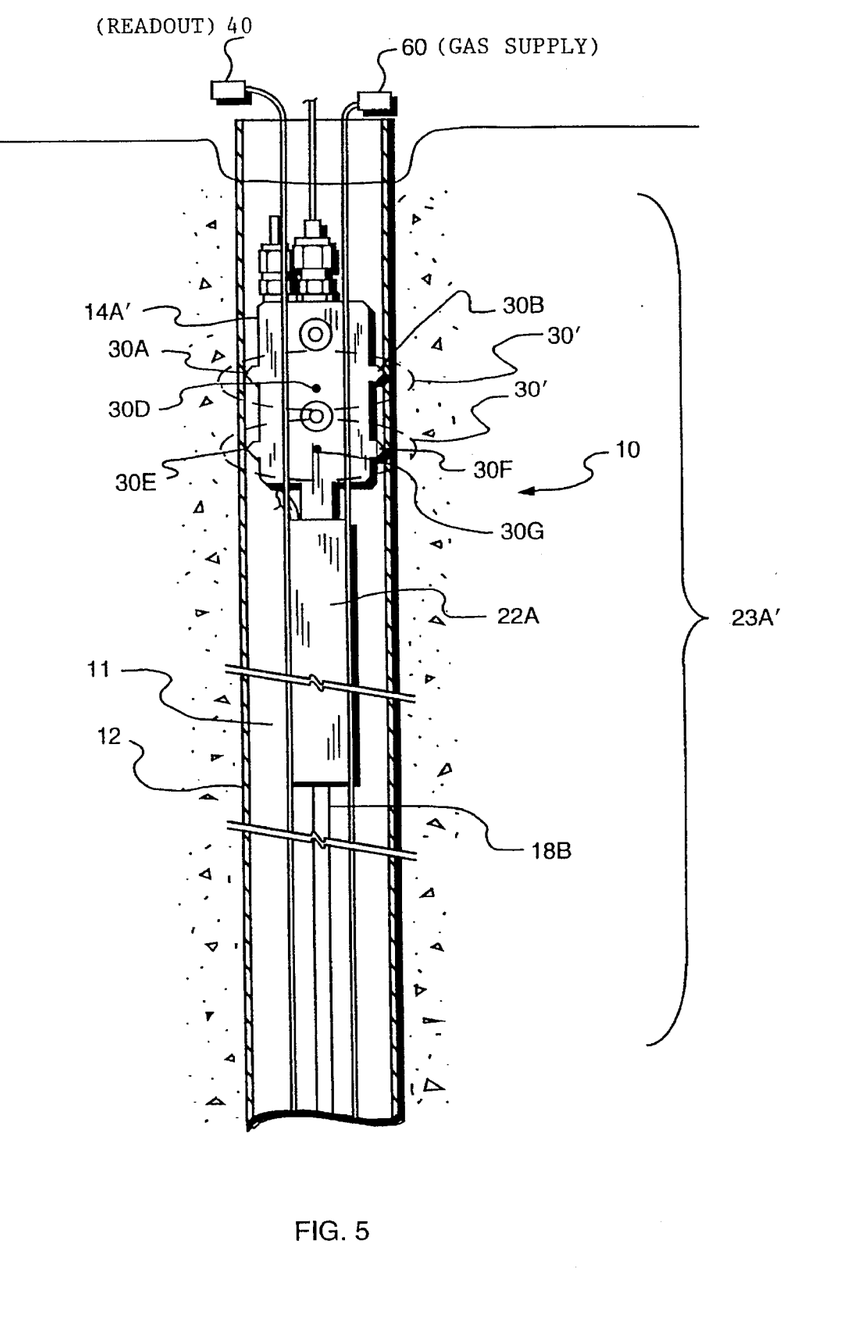
FIG. 5 is a sideview of a variant of an anchor-sensor assembly of the embodiment of FIG. 1.
Figure 6:
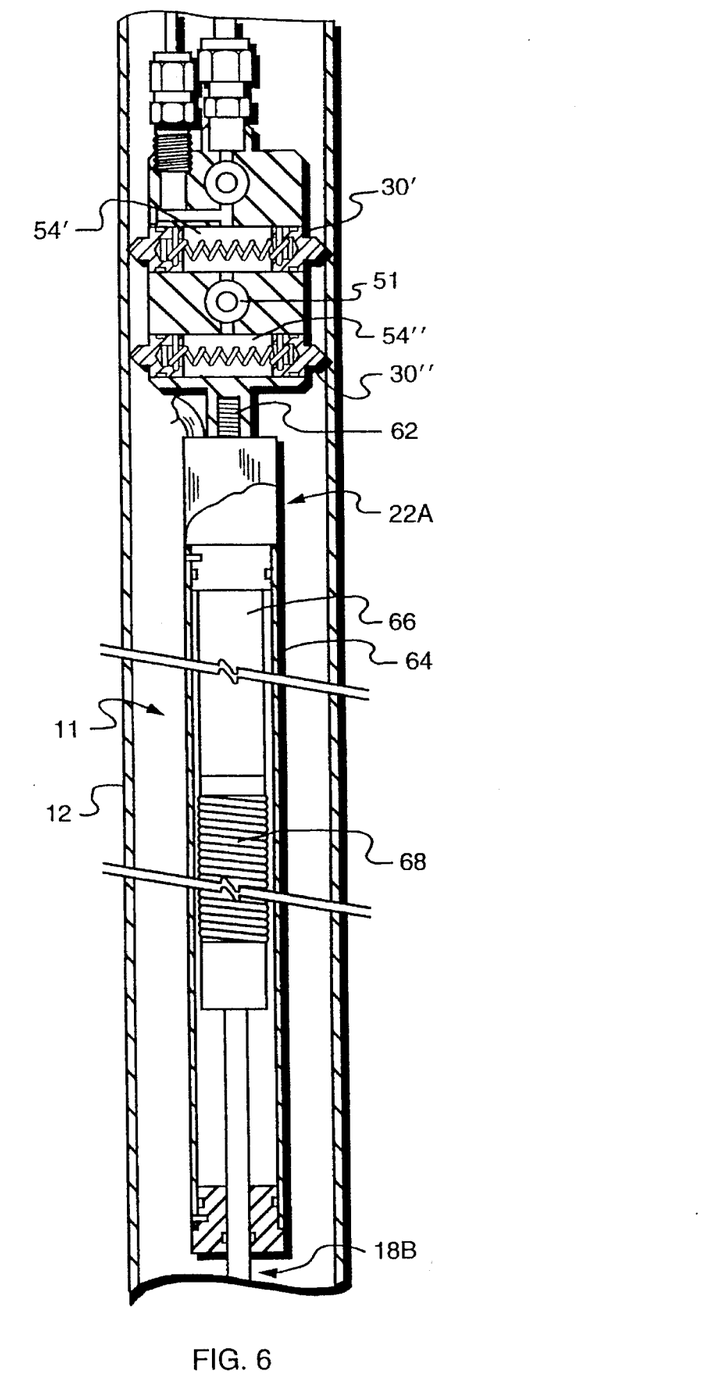
FIG. 6 is a more detailed side, cross-sectional view of the assembly of FIG. 5.

It is therefore evident that there has been provided in accordance with the present invention a borehole or pile strainmeter that fully satisfies the aims and objectives hereinbefore set forth. Although the present invention has been described in connection with preferred embodiments and methods of use, many modifications thereof are possible without departing from the present invention. For example, although the sensors 22A, 22B of embodiment 10 are of the type that transmit their readings of changes in axial positioning of the anchors as electrical signals through cable 26 to readout means 40, embodiment 10 could be modified to exchange this information via radio waves, without the need for cable 26. That is, sensors 22A, 22B could be modified to include conventional means for transmitting such information in the form of radio waves to conventional radio wave receiving means in readout means 40. Advantageously, such an arrangement would obviate the need for cable 26, and thereby, reduce the in-borehole bulk and complexity of embodiment 10. Other modifications are also possible. For example, as shown in FIGS. 5 and 6, the anchors may include two sets (shown enclosed in dashed lines 30' and 30", respectively) of piston means 30A . . . 30D, 30E . . . 30G, respectively. Each of the sets of piston means 30' and 30" is substantially identical to the piston means shown in FIGS. 1–3, except that each set 30' and 30" of pistons is disposed in its own respective internal cavity 54' or 54", which are connected in series via communication Channel 51 to permit gas to be supplied to both cavities 54' and 54". Advantageously, piston means 30' and 30" exhibit twice the engaging force on borehole 11 as the piston means shown in FIGS. 1–3, without requiring increase of the gas supply pressure from the actuation means. Many other modifications are also possible. Accordingly, the present invention should be viewed as being of broad scope, and as being defined only by the hereinafter appended claims.

What is claimed is:

1. A recoverable multiple position borehole strainmeter comprising, in combination, at least two anchors including respective sets of pistons for releasably engaging a borehole to releasably mount said anchors in said borehole in spaced-apart relationship to each other, actuation means for controllably actuating said sets of pistons to engage said borehole, said actuation means being adapted to permit each set of pistons to be independently actuable, said actuation means being controlled by control means outside said borehole, biasing means for preventing said sets of pistons from engaging said borehole when said sets of pistons are not being actuated by said actuation means, and sensing means for sensing changes in relative displacement between said two anchors whereby to monitor relative mass displacement axially along the borehole between said anchors;

wherein said actuation means includes means for controllably supplying gas under pressure to said anchors for actuating said sets of pistons to engage said borehole.

2. A strainmeter according to claim 1, and further comprising, at least one rod for interconnecting said two anchors and said sensing means.

3. A strainmeter according to claim 2, wherein said sensor means includes at least one transducer means connected to said at east one rod for measuring relative displacement between said anchors.

4. A strainmeter according to claim 3, wherein said sensor means includes a shaft tension spring for applying a tensile force to the connecting rod when said transducer means is positioned within a desired operating range.

5. A strainmeter according to claim 4, wherein said spring has a spring rate adapted to make said tensile force greater than gravitational force acting on the rod, whereby to permit said rod to remain oriented in said borehole so as to increase measurement accuracy of said strainmeter.

6. A strainmeter according to claim 1, wherein each said anchor comprises an internal cavity, each set of pistons comprises at least one pair of opposing locking pistons slidably mounted in a respective internal cavity of said anchors, and said anchors comprise openings adapted to permit said locking pistons to extend therefrom to engage said borehole when actuated by said actuation means.

7. A strainmeter according to claim 6, wherein said actuation means includes means for controllably supplying the internal cavities of said anchors with said pressurized gas whereby to force said locking pistons to extend from said openings.

8. A strainmeter according to claim 7, wherein said actuation means also comprises means for controllably, independently releasing said gas from said internal cavities.

9. A strainmeter according to claim 6, wherein said biasing means comprises a return spring connecting each said pair of locking pistons, said return spring being adapted to provide a contraction force to said locking pistons to prevent said locking pistons from engaging said borehole when not being actuated by said actuation means.

10. A strainmeter according to claim 1, wherein each said anchor comprises an internal cavity, each said set of pistons comprises two pairs of opposing locking pistons slidably mounted in said internal cavities of said anchor, and said anchors comprise openings adapted to permit said locking pistons to extend therefrom to engage said borehole when actuated by said actuation means.

11. A strainmeter according to claim 10, wherein said actuation means includes a controllable supply of pressurized gas for supplying said gas to a manifold, and separate gas flow control means for independently, controllably supplying each said internal cavity with said gas whereby to permit independent actuation of each set of locking pistons.

12. A strainmeter according to claim 1, further comprising, readout means for displaying an indication of said relative displacement, and wherein said sensing means is adapted to transmit information related to said indication to said readout means via radio waves.

13. A strainmeter according to claim 1, wherein said strainmeter is adapted to permit said strainmeter to be entirely assembled outside said borehole.

14. A strainmeter according to claim 1, wherein said actuation means includes a plurality of inflation tubes for supplying said gas to said anchors, and at least one of said anchors includes a plurality of channels adapted for confining said tubes therein.

15. A strainmeter according to claim 1, further comprising, means for pulling at least one of said anchors toward another of said anchors.

16. A recoverable multiple position borehole strainmeter, comprising in combination:
 a. a plurality of anchors, each of said anchors including an internal cavity, and piston means slidably mounted in said cavity for releasably engaging a borehole whereby to releasably mount said anchors in said borehole in spaced-apart relationship to each other;
 b. pneumatic actuation means for controllably actuating said piston means to engage said borehole, said actuation means including at least one supply of pressurized gas and a plurality of separate means for controllably, independently supplying said gas to the internal cavities of said anchors whereby to permit controllable, independent actuation of said piston means, said separate means being controlled by means outside said borehole;
 c. biasing means for preventing said piston means from engaging said borehole when said piston means are not being actuated by said actuation means; and
 d. transducer means for sensing changes in relative displacement between adjacent ones of said anchors whereby to monitor relative mass displacement axially along the borehole among said anchors.

17. A strainmeter according to claim 16, and further comprising, readout means for displaying an indication of said relative displacement.

18. A strainmeter according to claim 16, wherein said actuation means comprises means for controllably, independently releasing said gas from said internal cavities.

* * * * *